June 30, 1936.  G. H. KLEEKAMP  2,046,124
UNIVERSAL PIPE CONNECTER
Filed June 17, 1935
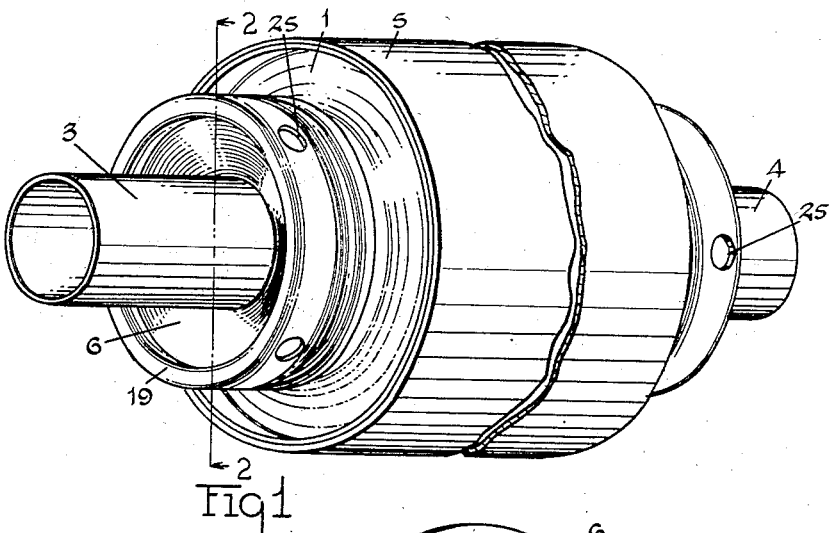
Fig 1
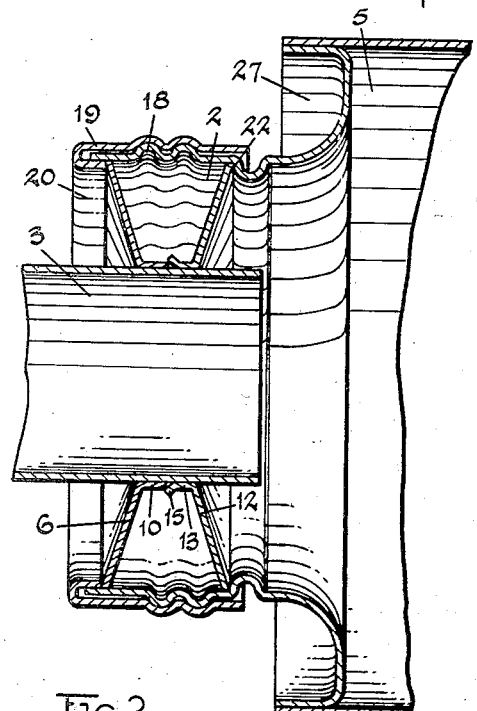
Fig 2
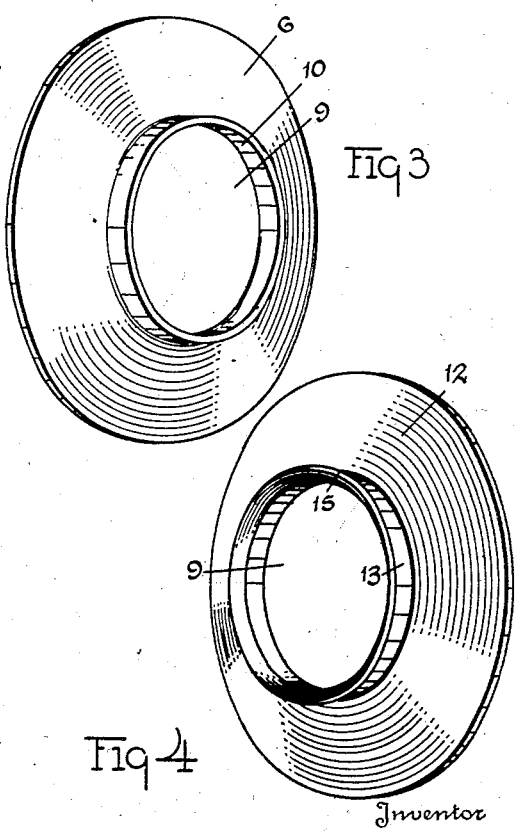
Fig 3
Fig 4
Inventor
George H. Kleekamp
By Ernest F. Crampton
Attorney Patented June 30, 1936

2,046,124

UNITED STATES PATENT OFFICE 2,046,124

UNIVERSAL PIPE CONNECTER

George H. Kleekamp, Defiance, Ohio, assignor to Arnold Haviland

Application June 17, 1935, Serial No. 27,000

5 Claims. (Cl. 285—183)

The object of my invention is to provide a coupler for connecting pipes together or to connect a pipe to a drum, such as a muffler, whereby a pipe, such as an exhaust pipe, may be coupled to an internal combustion muffler or other similar drum-shaped member.

One of the particular objects of my invention is to provide a universal pipe coupling so constructed and assembled as to form a gas-tight connection at the point of interjointure of pipes of the same or different sizes or the point of interjointure of a pipe and a drum-shaped member, such as a muffler, thus enabling the use of the muffler in conjunction with pipes of different diameters and consequently rendering the coupler universal in character.

The coupler of my invention is of particular commercial value in muffler assembly, since it provides means that enables ready assembly of the muffler having the coupler in conjunction with engines employing exhaust and tail pipes of different diameters.

The coupler may be manufactured at a minimum cost, and by its use standard mufflers may be used regardless of the diameters of the exhaust and tail pipes, thereby eliminating the necessity of particular mufflers in each variation of exhaust and tail pipe diameter.

The invention consists in other features and advantages which will appear from the following description and upon examination of the drawing. Structures containing the invention may partake of different forms and still embody the invention. To illustrate a practical application of the invention I have selected a coupler as an example of the various structures and details thereof that contain the invention and shall describe the selected coupler hereinafter, it being understood that variations may be made without departing from the spirit of the invention. The particular coupler selected is shown in the drawing and described hereinafter.

Fig. 1 is a perspective view of a muffler and shows the exhaust and tail pipes coupled to the muffler by means of the universal coupler of my invention. Fig. 2 is a section of the coupler taken on the plane of the line 2—2 in Fig. 1. Fig. 3 is a perspective view of a flanged locking disc shown in Fig. 2. Fig. 4 illustrates another of the flanged locking discs shown in Fig. 2.

The particular coupler shown in the drawing comprises a cylindrical part within which are located one or more discs having central openings, the diameters of which substantially conform to the diameter of the pipes to be coupled. The coupler also comprises means for wedging edge parts of the disc against the cylindrical part of the coupler and the pipe, as by a collar threaded on the cylindrical part and having a portion for engaging the outer edge of the disc.

In the form of construction shown in the drawing, the universal coupling 1 comprises a cylindrical portion 2 adapted to receive the end of a pipe, such as the exhaust pipe 3 or the tail pipe 4, and a flanged convex locking disc 6 having a central opening 9 approximating the diameter of the pipe, and an abutting part adapted to engage the edge of the flange 10 of the disc. A second similar disc may be used to form the abutting part and at its outer edge abuts a ridge formed in the cylindrical part. The inner edge portions of the discs abut with increasing pressure when their outer edges are drawn toward each other, and such abutment forms a rigid, gas-tight connection between the pipe and the muffler or between two pipes of the same or different diameters. In the form shown, the substantially similar discs 6 and 12 are convex in form and have centrally located flanged openings 9, the diameters of which substantially coincide with the diameter of the exhaust pipe 3 or the tail pipe 4 to be coupled to the muffler. The flanged portion 13 of the disc 12 is adapted to receive the outer edge of the flange portion 10 of the disc 6 in abutting relation and the flange portion 13 flares at its outer edge as at 15 to increase the wedging action of the flange part 10 against the part 13. The flaring portion serves also to maintain the edge of the flanged part 10 against the pipe, thereby maintaining the pressure of the flange against the pipe.

Not only does the outer edge portion of the flange 10 abut and wedge against the flanged portion 13, but the inner surfaces of the flanged portions abut the outer cylindrical surface of the pipe 3, and it is apparent that an increased pressure at the periphery of the disc 6 results in an increased pressure of abutment of the flanged part 10 against the exterior surface of the pipe, and when the disc 12 is engaged as against lateral movement with respect to the pipe, such increased pressure at the periphery of the disc 6 operates also to increase the abutment of the flange 13 against the exterior surface of the pipe and also to increase the wedged engagement of the flanged portions 10 and 13.

In the form of construction shown, the cylindrical part 2 is threaded, as at 18, and receives in threaded engagement a collar 19 having an inturned flange or lip portion 20. The lip portion 20 is adapted to engage the periphery of the disc 6 and consequently since the muffler 5 and the pipe 3 are maintained as against lateral movement with respect to each other, engagement of the disc 6 by the inturned flange 20 maintains a constant pressure against the periphery of the disc 6 and consequently of the flange 10 against the exterior surface of the pipe 3. This pressure tends to draw the pipe 3 and the muffler toward each other and due to the immovability of these members forms a gastight connection between the pipe and muffler.

It is apparent that if desired the pipe 3 may be provided with a protruding portion against which the outer edge of the flange 10 may wedge to form a gas-tight connection. If two discs, such as the discs 6 and 12, are employed to form a connection, the cylindrical part is provided with a bead 22 against which the periphery of the disc 12 is seated, and the flanged portion 13 of the disc 12 forms the surface against which the outer surface of the flange 10 wedges to form the abutting relationship between the flange 10 and the exterior surface of the pipe 3. Inasmuch as the bead 22 prevents lateral movement of the disc 12 with respect to the pipe, the pressure of the inturned flange 20 forces the flanged portion 10 into wedged engagement with the flaring portion 15 of the disc 12 and the interior surfaces of the flanges 10 and 13 against the exterior surfaces of the pipe 3 to form the gas-tight seal and connection.

Increased pressure of the lip portion 20 against the periphery of the disc 6 increases the abutting pressure of the flanged portions 10 and 13 against each other and against the exterior surface of the pipe. If desired, the collar 19 and the cylindrical part 2 may be provided with openings, such as the openings 25, adapted to receive a suitable instrument whereby the collar may be tightened with respect to the cylindrical part, resulting in an increased abutting pressure of the lip portion 20 against the disc 6 and consequently adjusting the abutting pressure of the flange portions 10 and 13 against each other and the exterior surface of the pipe 3.

If desired, the disc 6 may be provided with radially extending slots to near the flange 10 to produce a resilient pressure of its flanged part in its wedging relation to the flanged part of the other disc.

When the coupler is assembled, a coupler 1 is inserted in each end of the muffler drum 5 and forms a head. The flange portion 27 of the coupler may be welded in the end of the muffler. Where two discs are employed, the disc 12 is seated against the bead 22 of the cylindrical part 2, and the periphery of the disc 6 is engaged by the inturned flange of the collar which is threaded on to the cylindrical part 22. The pressure of the lip 20 against the periphery may be adjusted by adjustment of the collar through the openings 25. The discs 6 and 12 are formed of standard diameters, and the openings 9 may vary in diameter to conform to the standard diameter range of exhaust and tail pipes, so that in assembly, discs having central openings substantially conforming to the diameters of pipes to be coupled to the muffler may be selected.

Due to the universal character of the coupler, exhaust and tail pipes of different diameters may be coupled in the same manner to the muffler, as indicated in Fig. 1 of the drawing, or pipes of different or the same diameters may be connected together in the same manner to form a gas-tight seal and connection by mere extension or duplication of the cylindrical part from the bead outwardly, the collar, and one or both of the discs.

I claim:

1. In a pipe coupler, a cylindrical member for receiving a pipe, a convex disc having a central opening substantially fitting the pipe, a second convex disc member seated in the cylindrical part for engaging the inner edge of the first named disc, the cylindrical part having means for engaging the outer edge of the first named disc and for wedging the first named disc against the pipe and the inner edge of the second named disc, and means for adjusting the last named means.

2. In a pipe coupler, a cylindrical member adapted to receive a pipe, a convex disc having a central opening substantially fitting the pipe, a second convex disc for engaging the inner edge of the first named disc, the cylinder member having a bead for engaging the outer edge of the second named disc, a collar adapted to be received in threaded engagement with the cylindrical member and having means for engaging the outer edge of the first named disc and for wedging the first named disc against the pipe and against the second named disc.

3. In a pipe coupler, a cylindrical member adapted to receive a pipe, a convex disc having a central opening substantially fitting the pipe, the said disc having a flange located about the said opening, a second disc having a flange for engaging the first named flange, the cylindrical member having a bead for receiving the outer edge of the second named disc, the cylindrical part adapted to receive a collar in threaded engagement, the collar having an inturned flange for engaging the outer edge of the first named disc and for wedging the flange of the first named disc against the pipe and against the flange of the second named disc, and means for adjusting the pressure of the said flanges against each other and the pipe.

4. In a pipe coupler, a cylindrical member adapted to receive a pipe, a pair of convex discs having central registering openings substantially fitting the pipe, the said discs having flanges about the openings, the cylindrical member having a bead for receiving the outer edge of one of the said discs, the flange of the said disc having a flaring portion, a collar, the cylindrical member adapted to receive the collar in threaded engagement, the collar having a lip portion adapted to engage the outer edge of the said other disc and wedge the flange of the said other disc against the flange of the first named disc and the said flaring portion and against the pipe for securing the pipe in the connecter as against longitudinal movement, the said collar and cylindrical part adapted to be adjusted to adjust the pressure of the lip portion against the outer edge of the second named disc and the pressure of the flanges of the discs against each other and the pipe.

5. In a coupler, a pair of cylindrical members, the end part of one member located within the end part of the other member, a pair of convex disks having central openings fitting the exterior end part of the inner member, the outer edges of the disk fitting the interior of the end part of the outer member, the disks having interengaging edge parts, means located on one of the members for pressing the non-engaging edge parts of the disks towards each other and against the surface of the member on which the said means is located and the interengaging edges of the disks against each other and against the other member.

GEORGE H. KLEEKAMP.